United States Patent
Joe (10) Patent No.: US 8,950,421 B2
(45) Date of Patent: Feb. 10, 2015

(54) CONDENSATE DRAIN FOR COMPRESSED AIR SYSTEM

(75) Inventor: Woon Je Joe, Gimhae-si (KR)

(73) Assignee: Woon Je Joe, Gyeongsangnam-do (KR)

( * ) Notice: Subject to any disclaimer, the term of this patent is extended or adjusted under 35 U.S.C. 154(b) by 1009 days.

(21) Appl. No.: 12/061,697

(22) Filed: Apr. 3, 2008

(65) Prior Publication Data

US 2008/0283126 A1 Nov. 20, 2008

(30) Foreign Application Priority Data

May 18, 2007 (KR) .................. 20-2007-000 8201 U (51) Int. Cl.
| | |
|---|---|
| *F16T 1/24* | (2006.01) |
| *F16K 31/34* | (2006.01) |
| *F16K 31/20* | (2006.01) |
| *F15B 21/04* | (2006.01) |

(52) U.S. Cl.
CPC *F15B 21/048* (2013.01); *F16T 1/24* (2013.01)
USPC ......................................... 137/195; 251/331

(58) Field of Classification Search
CPC ............... F16T 1/386; F16T 1/24; F16T 1/22; F16T 1/45; F16K 31/24; F16K 31/20; B67D 7/763; B01D 19/0063; F24D 19/081
USPC ......... 137/171, 177, 183, 187, 192, 195, 196; 251/331
See application file for complete search history.

(56) References Cited

U.S. PATENT DOCUMENTS

| | | | | | |
|---|---|---|---|---|---|
| 969,282 | A | * | 9/1910 | Humberstone | 137/195 |
| 1,114,360 | A | * | 10/1914 | Hornung | 73/224 |
| 1,285,771 | A | * | 11/1918 | Mertens et al. | 137/195 |
| 1,285,772 | A | * | 11/1918 | Mertens | 137/195 |
| 1,439,196 | A | * | 12/1922 | Skortz | 251/52 |
| 3,419,035 | A | * | 12/1968 | Hart | 137/174 |
| 3,486,303 | A | * | 12/1969 | Glass et al. | 96/114 |
| 4,974,626 | A | * | 12/1990 | Koch | 137/187 |
| 5,595,210 | A | * | 1/1997 | Kushiya | 137/181 |
| 5,626,163 | A | * | 5/1997 | Kushiya | 137/181 |
| 5,687,754 | A | * | 11/1997 | Nemeth et al. | 137/179 |
| 2001/0019116 | A1 | * | 9/2001 | Fukano et al. | 251/63.6 |

FOREIGN PATENT DOCUMENTS

KR 10-2002-0028929 A 4/2002

* cited by examiner

*Primary Examiner* — Craig Schneider
(74) *Attorney, Agent, or Firm* — Saliwanchik, Lloyd & Eisenschenk (57) ABSTRACT

A condensate drain for a compressed air system is provided. The condensate drain includes a storage unit, an opening/closing member, and an adjusting member. The storage unit collects condensate and includes a storage main body defining a storage compartment within, and a storage panel sealing one side of the storage main body. The opening/closing member is provided at a side of the storage unit, to selectively open and close a passage through which condensate drains to an outside through an opening/closing valve. The adjusting member is provided at a side and within the storage unit, to adjust the opening/closing member. The opening/closing valve can be formed of an elastic material.

4 Claims, 6 Drawing Sheets

CONDENSATE DRAIN FOR COMPRESSED AIR SYSTEM

CROSS-REFERENCE TO RELATED APPLICATION

The present application claims the benefit under 35 U.S.C. §119 of Korean Patent Application No. 20-2007-0008201, filed May 18, 2007, which is hereby incorporated by reference in its entirety.

BACKGROUND

The present disclosure relates to a condensate drain for a compressed air system that drains condensate generated from moisture when moist atmospheric air is compressed by various compressed air systems used at industrial sites.

Generally, in a production line, condensate is generated from compression of air by a compressed air system. When the condensate is not duly removed, it can cause malfunctioning of equipment. Specifically, reverse flow of air into a compressor can cause function loss of the compressor, and infiltration of condensate into various auxiliary components can lead to severe problems such as discontinuation in production line operation and product defects.

Related art condensate drains for compressed air systems can largely be divided into integrated ball float and valve drains, indirect drains with a separate ball float and valve, electromagnetic solenoid drains, and integrated drains with an electromagnetic solenoid coupled with a sensor.

However, the above related art condensate drains have many limitations.

First, in integrated ball float and valve drains, because the ball float directly controls the drain hole, it is difficult to employ a drain nozzle size exceeding 3 mm, and as a result, scale deposits and other impurities inside the drain passage can easily clog and block the drain hole. Thus, periodic disassembly and cleaning is required.

Also, in an electromagnetic solenoid drain, while condensate is collected at regular intervals and forcefully drained at preset times externally, compressed air is discharged to the outside together with the condensate. Thus, not only is energy lost, but an external power source must be connected to the drain during on-site installation of equipment, presenting limitations for the use of electromagnetic solenoid drains.

Moreover, an integrated drain with an electromagnetic solenoid coupled with a sensor employs a diaphragm valve made of a synthetic rubber material. This type of drain also requires an external power source.

BRIEF SUMMARY

Embodiments of the present invention can provide a condensate drain for a compressed air system that detects the water level of condensate in a storage and automatically drains the condensate externally when the water level rises above a predetermined level.

Embodiments can also provide a condensate drain for a compressed air system capable of easily draining condensate without an external power supply.

In one embodiment, a condensate drain for a compressed air system includes: a storage unit collecting condensate, the storage unit including a storage main body defining a storage compartment within, and a storage panel sealing one side of the storage main body; an opening/closing member at a side of the storage unit to selectively open and close a passage through which condensate drains to an outside through an opening/closing valve; and an adjusting member at a side of the storage unit, to adjust the opening/closing member, wherein the opening/closing valve is formed of an elastic material.

In embodiments of the present invention, condensate generated during compression of air can be drained automatically. Therefore, there is no need for power to be supplied from an external source, and electric short circuits and malfunctions can be inhibited.

Also, in embodiments of the present invention, because the system pressure on either side of the opening/closing valve that opens and closes the condensate draining passage is concomitant, the opening/closing valve is opened only when more than a predetermined quantity of condensate collects inside the storage. That is, the ball float does not rise in accordance with the water level of condensate, and the opening/closing valve only opens when accumulated condensate reaches a predetermined water level. Also, after the opening/closing valve opens, it is designed to close immediately. Thus, the duration in which the inside and outside of the storage space are communicated is shortened, reducing system pressure loss.

Furthermore, in an embodiment described in the present disclosure, the opening/closing valve that opens and closes the condensate drain passage is formed of an elastic material, negating the need for moving the opening/closing valve itself, so that contaminants already present or generated in the system can be prevented from interfering with the opening and closing of the passage. Specifically, even when contaminants are present on the edge of the opening/closing valve, they will not affect the operation of the opening/closing valve because only the central portion of the opening/closing valve is moved up and down.

Accordingly, in embodiments of the present invention, the water level of condensate may be detected without a separate external power supply, and loss of pressure from leaking air can be minimized because draining of condensate is immediate. Further, because the opening/closing valve can be formed of an elastic material, proper opening and closing of the draining passage can be maintained despite the presence of various contaminants within the passage. Thus, a higher quality product results.

The details of one or more embodiments are set forth in the accompanying drawings and the description below. Other features will be apparent from the description and drawings, and from the claims.

DETAILED DESCRIPTION

Reference will now be made in detail to the embodiments of the present disclosure, examples of which are illustrated in the accompanying drawings.

Figure 1:
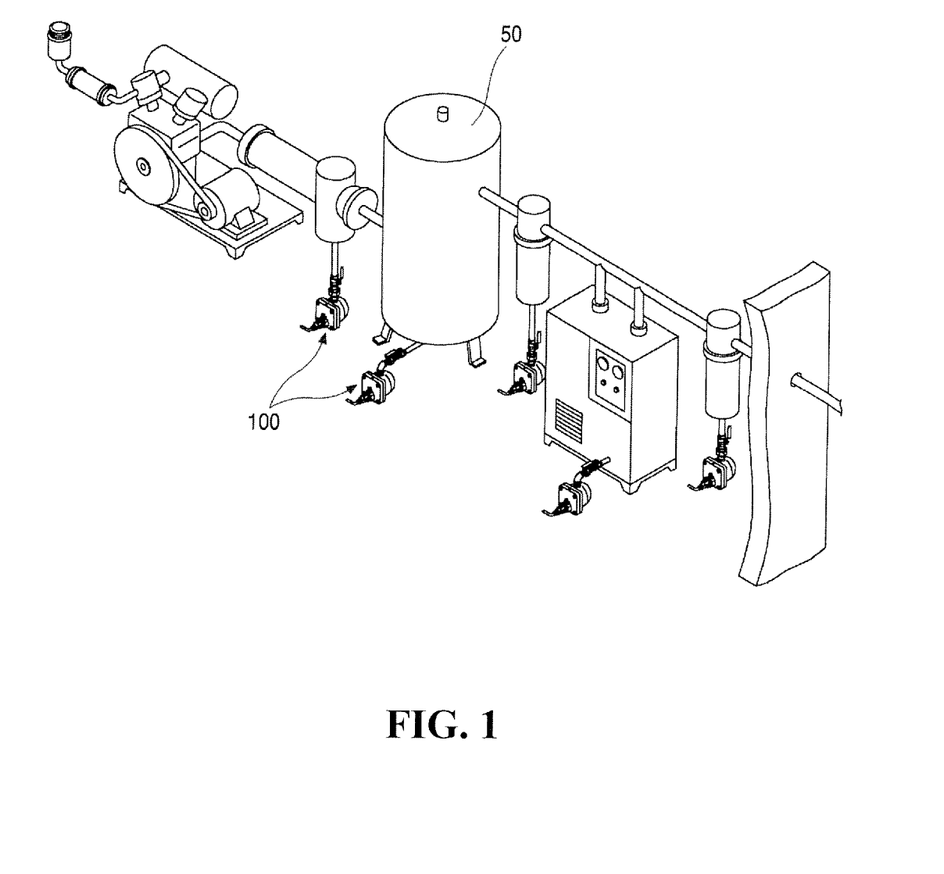
FIG. 1 is a perspective view of an exemplary compressed air system employing a condensate drain according to the present disclosure.

FIG. 1 is a perspective view of an exemplary compressed air system employing a condensate drain according to the present disclosure.

Referring to FIG. 1, a condensate drain 100 provided in plurality can be connected to and installed on one or more compression tanks 50. That is, the condensate drains 100 can be installed at the bottom of the compression tanks 50. Condensate generated through compression of air is collected in the compression tanks 50, and the collected condensate is drained externally.

Figure 2:
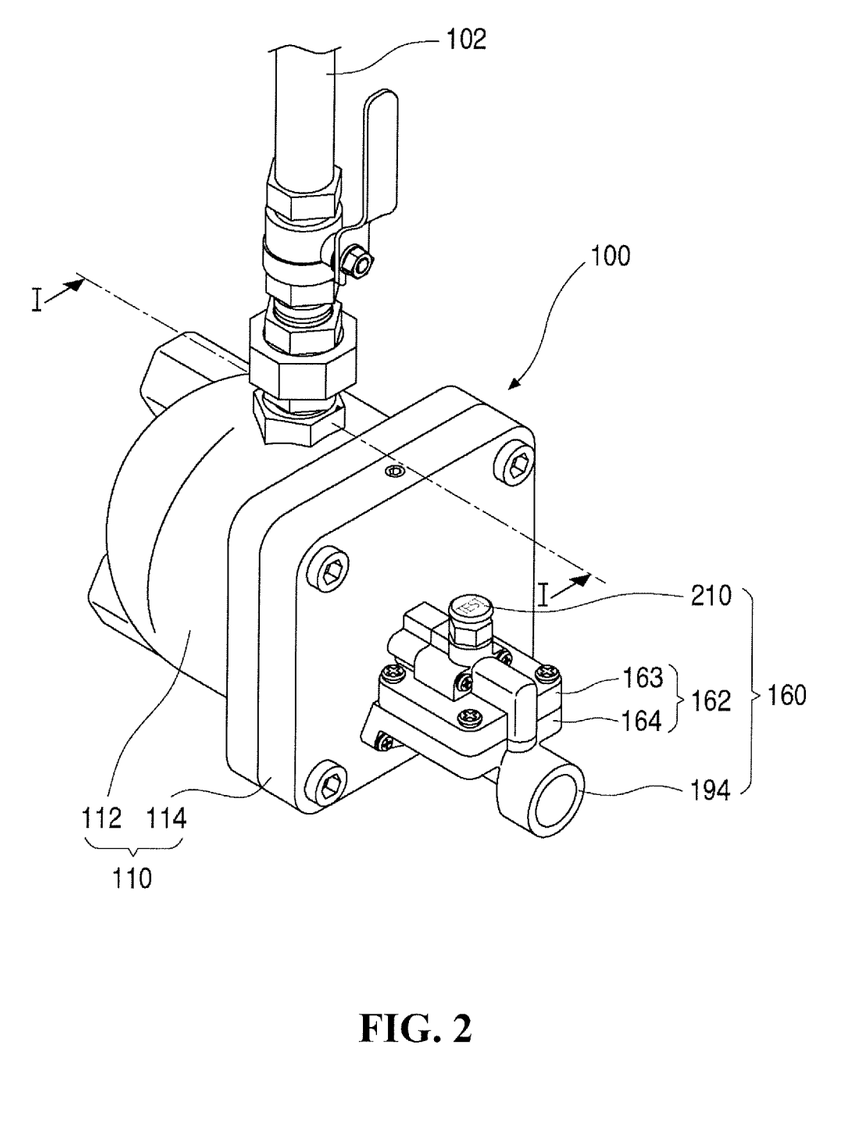
FIG. 2 is a perspective view of condensate drain for a compressed air system according to the present disclosure.
Figure 3:
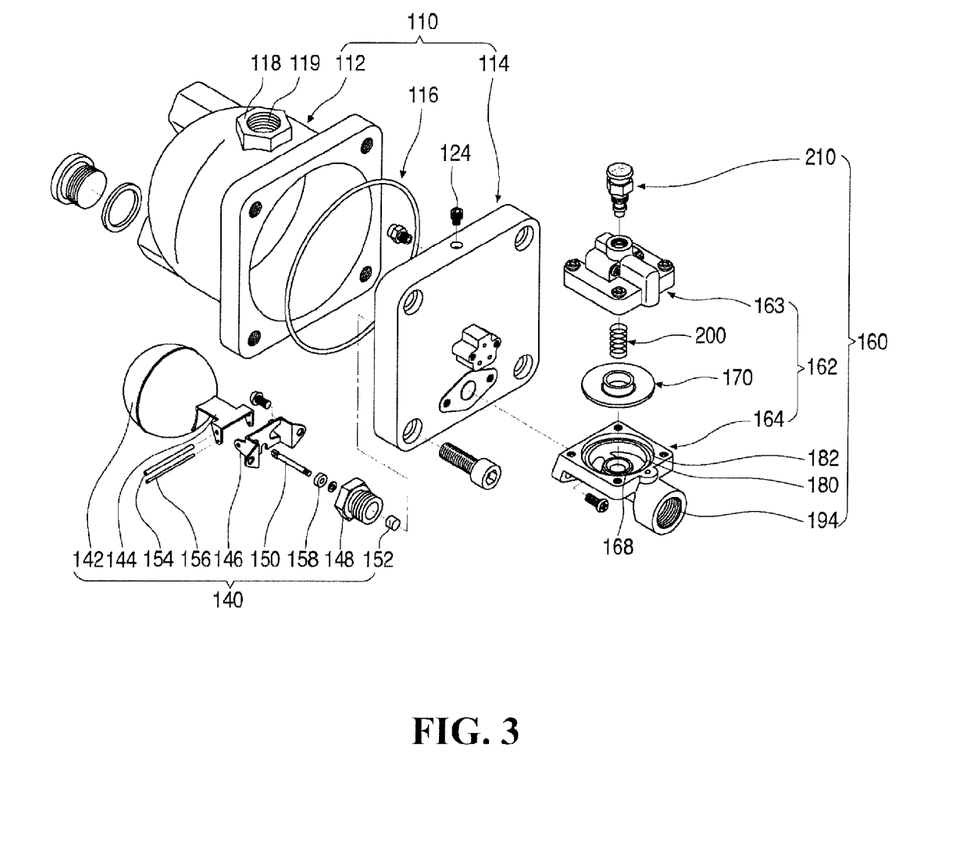
FIG. 3 is an exploded configurative perspective view of a condensate drain for a compressed air system according to a preferred embodiment of the present disclosure.
Figure 4:
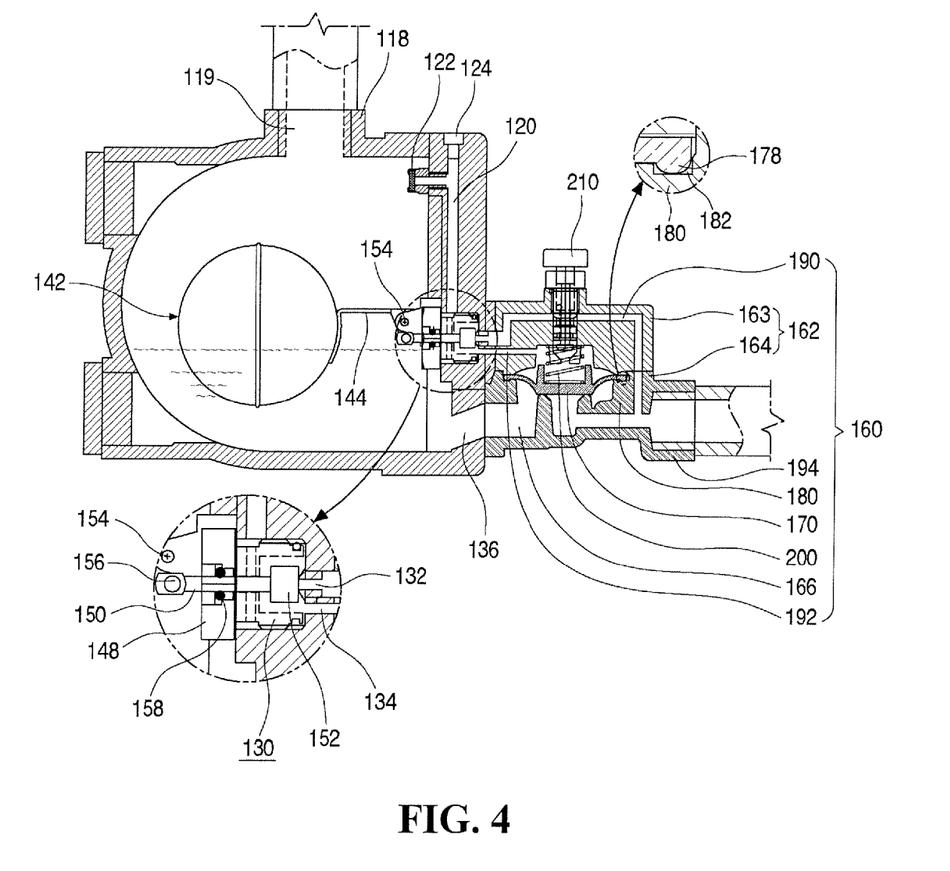
FIG. 4 is a cross-sectional view of FIG. 2 taken along line I-I.
Figure 5:
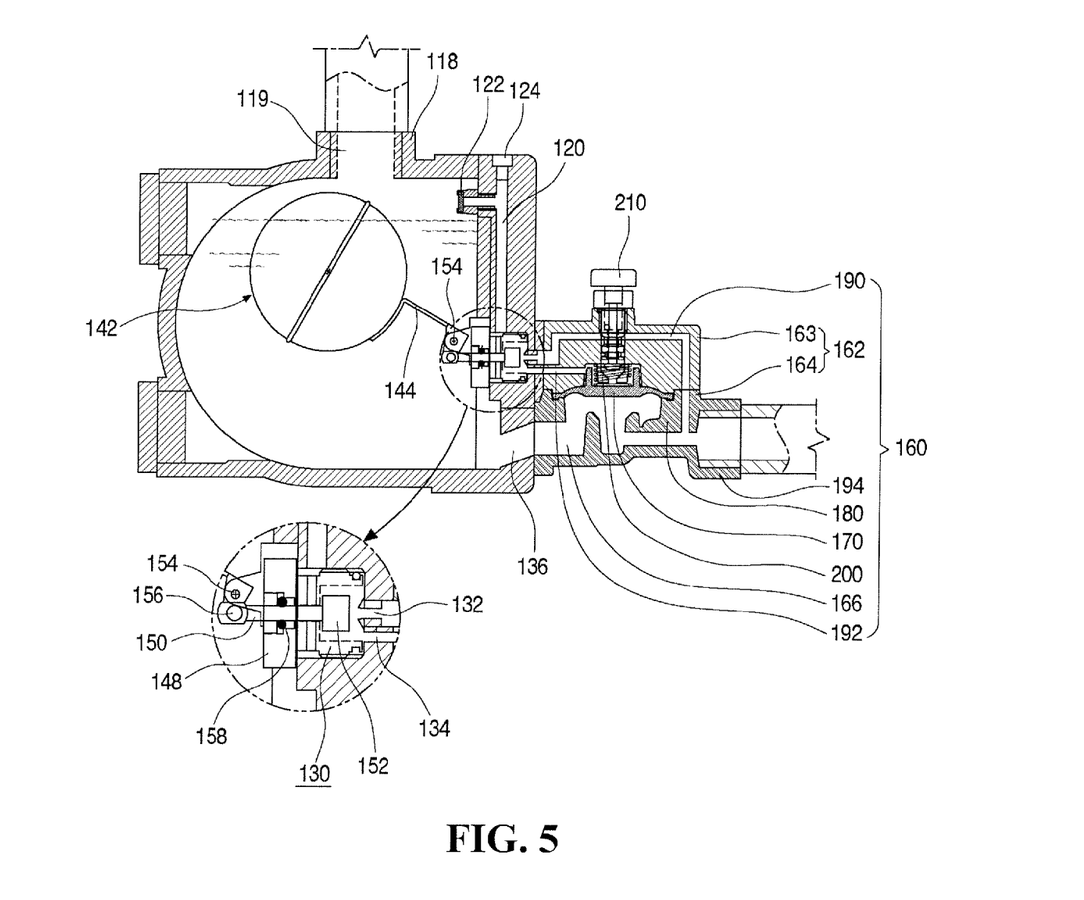
FIG. 5 is a cross-sectional view of the condensate drain in FIG. 4 showing condensate being drained.
Figure 6:
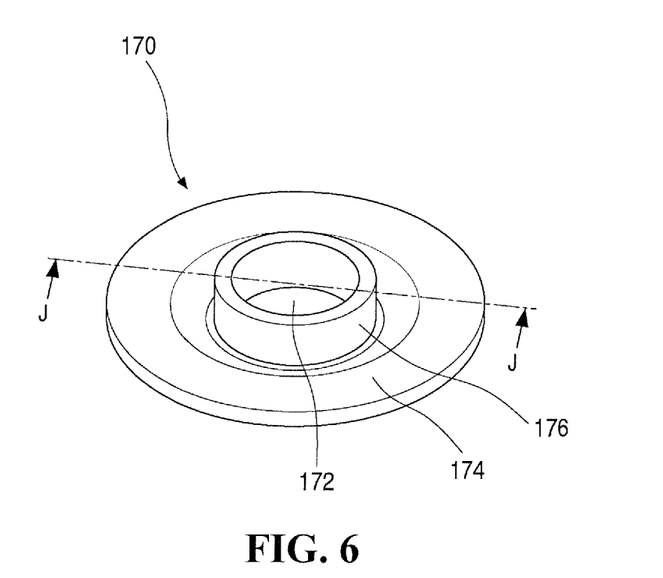
FIG. 6 is a perspective view an opening/closing valve according to embodiments of the present disclosure.
Figure 7:
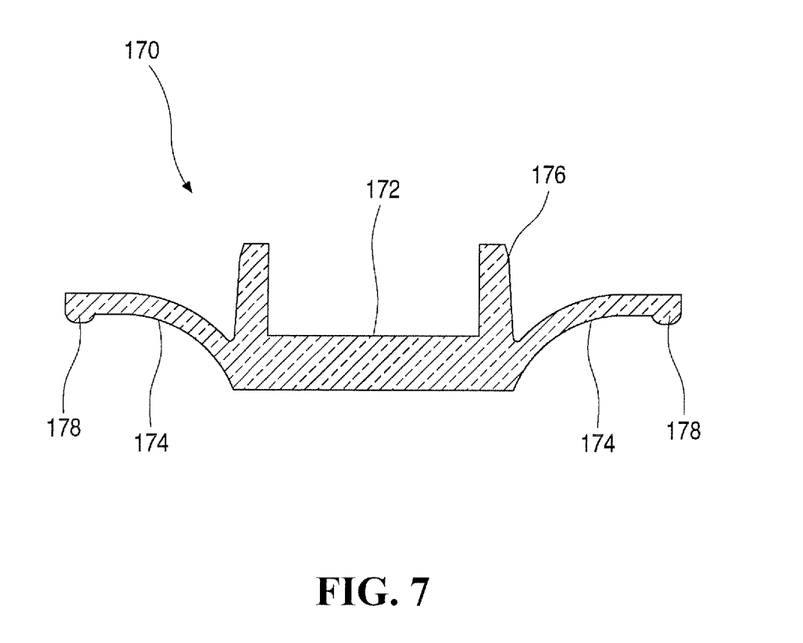
FIG. 7 is a cross-sectional view of FIG. 6 taken along line J-J.

FIG. 2 is a perspective view of a condensate drain for a compressed air system according a preferred embodiment of the present disclosure, and FIG. 3 is an exploded perspective view of a condensate drain for a compressed air system according to a preferred embodiment of the present disclosure. FIGS. 4 and 5 are cross-sectional views of a condensate drain for a compressed air system according to an embodiment of the present invention. In particular, FIG. 4 is a cross-sectional view showing condensate being collected, and FIG. 5 is a cross-sectional view showing condensate being drained. FIGS. 6 and 7 are a perspective view and a cross-sectional view, respectively, of an opening/closing valve according to an embodiment of the present disclosure.

Referring to FIGS. 2 to 7, a condensate drain 100 according to an embodiment of the present invention can be connected to a compression tank 50 through a connecting pipe 102, and can include a storage unit 110 defining a predetermined internal space in which air and condensate are collected, an opening/closing member 160 provided at a side of the storage unit 110 to selectively open and close a passage through which the stored condensate is drained, and an adjusting member 140 provided within the storage unit 110 to control the opening/closing member 160.

The storage unit 110 can be formed of a storage main body 112 defining a storage space within, and a storage panel 114 sealing a side of the storage main body 112. The storage main body 112, as shown in the diagrams, is formed in a shape open at one side (shown open to the right in the figures), and a predetermined space is defined within the storage main body 112 to hold condensate. The storage panel 114 can be formed in a rectangular flat plate shape. The storage panel 114 seals the right side of the storage main body 112.

Thus, in one embodiment as shown in FIG. 3 where the storage main body 112 and the storage panel 114 are fastened by means of a plurality of screws, an O-ring 116 can be further inserted between the storage main body 112 and the storage panel 114 to inhibit leakage of air or condensate therebetween.

According to an embodiment, the top surface of the storage main body 112 can have an inlet 118 defined therein. The inlet 118 is a portion to which a connecting pipe 102 is fastened. An inlet hole 119 can be defined vertically through the inlet 118. Accordingly, air and condensate enter into the storage main body 112 through the inlet hole 119.

The above-described inlet 118 may be provided in plurality if needed, and the position at which it is defined may be varied also. That is, the inlet 118 may be defined at a side of the storage main body 112 (such as the left side—opposite the open end of the storage main body 112—in the figures), or may be defined in both the top surface and side of the storage main body 112.

Referring to FIGS. 4 and 5, an air inlet passage 120 that guides the flow of air can be further defined in the storage unit 110. According to an embodiment as shown, the air inlet passage 120, through which air flows within the storage main body 112, can be formed in the storage panel 114. The air inlet passage 120 can be formed in a -|-shape, such as shown in FIG. 4.

A filter 122 can be installed at an open side end of the air inlet passage 120. The filter 122 filters contaminants in the air that enters into the storage main body 112 through the air inlet passage 120. A sealing bolt 124 can be used to seal the top end of the air inlet passage 120. The bottom end of the air inlet passage 120 can communicate with an air compartment 130 (described below).

An air compartment 130 of a predetermined size can be formed at the bottom portion of the storage panel 114. The air compartment 130 is a space to which the air inlet passage 120 and an air outlet passage 190 (described below) are connected, and where an adjusting bolt 148 (described below) is fastened to the air compartment 130.

Referring to FIGS. 4 and 5, an auxiliary passage 132 is defined from left to right across the figures at the right of the air compartment 130. The auxiliary passage 132 functions to connect and communicate the air compartment 130 with the air outlet passage 190.

Another auxiliary fluid passage 134 can be further defined from left to right across the figures below the auxiliary passage 132. The auxiliary fluid passage 134 is a passage connecting the air compartment 130 with an air passage 192 (described below).

A condensate auxiliary passage 136 is further defined from left to right across the figures at the bottom end of the storage panel 114 to guide the draining of condensate. The condensate auxiliary passage 136 can be a portion connecting the storage compartment defined within the storage main body 112 to a condensate draining passage 166 (described below).

The adjusting member 140 can be provided within the storage unit 110. Referring to FIG. 3, the adjusting member can include a ball float 142 for detecting the water level of condensate collected in the storage compartment within the storage unit 110, a float aim 144 supporting the ball float 142, a float fixing bracket 146 for fixing the float arm 144 to the inner surface of the storage unit 110, an adjusting bolt 148 inserted and installed in the air compartment 130, an adjusting pin 150 passing through the adjusting bolt 148, and a needle valve 152 provided at one end of the adjusting pin 150 to selectively open and close the auxiliary passage 132.

The ball float 142 can have a hollow interior filled with air, so that it floats on condensate stored within the storage unit 110. As the ball float 142 is commonly used in water level controlling mechanisms, a detailed description thereof will not be provided.

The float arm 144 can be pivotably installed on the float fixing bracket 146. That is, one end of the float arm 144 can be coupled by means of a hinge to one end of the float fixing bracket 146. Thus, a hinge pin 154, which becomes the pivoting center of the float arm 144 with respect to the float fixing bracket 146, can be inserted through the respective ends thereof. The opposite end of the float fixing bracket 146 can be fixed and installed to the storage panel 114.

A connecting pin 156 can be further installed at the right, lower end of the float arm 144. The connecting pin 156 is a portion on which the left end of the adjusting pin 150 catches. Thus, the float arm 144 moves the adjusting pin 150 laterally when the ball float 142 moves vertically.

The adjusting bolt 148 may be formed outwardly as a conventional bolt, and can be coupled by screwing into the air compartment 130. A gap or a separate passage can be formed between the adjusting bolt 148 and the air compartment 130. Accordingly, the gap or passage allows the air inlet passage 120 and the auxiliary passage 132 to communicate, allowing the flow of air or condensate.

The adjusting bolt 148 defines an opening laterally therethrough, and the adjusting pin 150 can be installed laterally through the opening of the adjusting bolt 148. The adjusting pin 150 can be provided with a sealing packing 158 to inhibit flow of condensate within the storage unit 110 through the adjusting bolt 148. According to certain embodiments, the sealing packing 158 can be provided to install the adjusting pin 150 and inhibit flow of condensate through the space within the adjusting bolt 148. In one embodiment, the sealing packing 158 is formed of a rubber material.

The needle valve 152 can be coupled to the right end of the adjusting pin 150. Thus, the needle valve 152 can open and close the auxiliary passage 132 according to the lateral movement of the adjusting pin 150.

The opening/closing member 160 can include an opening/closing case 162 mounted to an outside of the storage unit 110 to form the exterior of the opening/closing member 160, a condensate draining passage 166 formed inside the opening/closing case 162 to guide the draining of condensate, and an opening/closing valve 170 opening and closing the condensate draining passage 166.

The opening/closing case 162 can be formed of an upper case 163 and a lower case 164 dividing the opening/closing case 162 into upper and lower sections. In one embodiment, the upper case 163 and the lower case 164 can be fastened together by means of screws. The opening/closing valve 170 can be inserted between the upper case 163 and the lower case 164.

As shown in the diagrams, the condensate draining passage 166 is defined laterally in the lower case 164. Also as shown, the condensate draining passage 166 has a shape that is bent downward. That is, a protruding valve seat 168 (as shown in FIG. 3) is formed above the central portion of the lower case 164, and flow of condensate occurs within and around the valve seat 168.

The valve seat 168 can have a round shape, and the undersurface of the opening/closing valve 170 can be selectively sealed against the upper end of the valve seat 168.

According to an embodiment, a valve mounting portion 180 is recessed downward into the upper surface of the lower case 164. The valve mounting portion 180, as shown in the diagrams, can have a round shape, and receives the edge (perimeter) of the opening/closing valve 170 mounted therein. A recessed fixing slot 182 is further recessed downward at the edge of the valve mounting portion 180. The fixing slot 182 can receive a fixing end 178 of the opening/closing valve 170 (to be described below).

The opening/closing valve 170 can be formed of an elastic material in an overall circular shape. That is, the opening/closing valve 170 may be formed of an elastic material such as rubber.

Referring also to FIGS. 6 and 7, the opening/closing valve 170 can include an opening/closing plate 172 that selectively contacts the valve seat 168 to open and close the condensate draining passage 166 through which condensate is drained, an outer plate 174 extending radially outward from the edge of the opening/closing plate 172, and a receiving protrusion 176 protruding upward from the edge of the opening/closing plate 172.

The opening/closing plate 172 can be formed as a circular plate corresponding to the valve seat 168. A circular metal plate can be further attached to the opening/closing plate 172 to strengthen and reinforce a firm seal against the valve seat 168.

The outer plate 174 can be formed to have a rounded shape. The edge of the outer plate 174 can be mounted on the valve mounting portion 180. Thus, the edge of the outer plate 174 can be fixed in place by the upper case 163 and the lower case 164.

A fixing end 178 can be further formed on the edge (perimeter) of the outer plate 174. To firmly fix the outer plate 174 to the upper case 163 and the lower case 164 and inhibit disengaging thereof, the fixing end 178 protrudes downward from the lower edge portion of lower case of the outer plate 174. Thus, the fixing end 178 can be inserted and held in the fixing slot 182 of the valve mounting portion 180.

The receiving protrusion 176 is a portion that receives a valve spring 200 (to be described below). That is, the receiving protrusion 176 defines a cylindrical space in which the bottom end of the valve spring 200 is held.

According to an embodiment, the air outlet passage 190 and an air passage 192 are respectively defined through the upper case 163. The air outlet passage 190 communicates with the auxiliary passage 132, and the right end of the air outlet passage 190 directly communicates with an outlet end 194 formed at the right end of the opening/closing member 160. The air passage 192 communicates with the space between the upper case 163 and the lower case 164.

The valve spring 200 can be provided between the upper case 163 and the lower case 164. The valve spring 200 biases the opening/closing valve 170 in one direction (downward). In one embodiment, the valve spring 200 is a compression spring. Accordingly, in operation, the biasing force of the valve spring 200 presses the undersurface of the opening/closing valve 170 against the top end of the valve seat 168.

An outlet valve 210 can be further installed on the upper case 163. The outlet valve 210 can be installed to be capable of vertical movement for selectively communicating the air outlet passage 190 with the air passage 192 and controlling the opening/closing valve 170 in opening the condensate draining passage 166.

In more detail, the outlet valve 210 defines a predetermined passage to temporarily connect the air outlet passage 190 and the air passage 192.

Accordingly, when the outlet valve 210 is pressed, the air outlet passage 190 and the air passage 192 are communicated through the passage defined in the outlet valve 210. Here, air compressed in the air passage 192 passes through the air outlet passage 190 and escapes to the outside. In addition, when the opening/closing valve 170 is opened, condensate within the storage unit 110 is drained through the condensate draining passage 166 to the outside.

Below, the effects of the condensate drain for a compressed air system according to the present disclosure will be described.

The condensate drain 100 according to the present disclosure draws in moist air from the atmosphere during compression of air by compressed air systems used in various industrial sites, and automatically drains only condensate without loss of air pressure whenever condensate is generated during compression of air.

First, because the connecting pipe 102 is connected to the compression tank 50, condensate collects within the storage unit 110 through the connecting pipe 102, and because the inside of the storage unit 110 is communicated with the compression tank 50, a predetermined air pressure is present.

Referring to FIG. 4, when the ball float 142 is in a descended position, the needle valve 152 blocks the auxiliary passage 132. Thus, the air outlet passage 190 and the inside of the storage unit 110 are blocked.

Because the air passage 192 communicates with the inside of the storage unit 110, the compressed air within the storage unit 110 acts upon the upper surface of the opening/closing valve 170, pressing the opening/closing valve 170 downward. That is, the air compartment 130 is communicated with the inside of the storage unit 110 through the air inlet passage 120, so that the air pressure in the air compartment 130 acts upon the top surface of the opening/closing valve 170 through the air passage 192.

Also, the valve spring 200 formed as a compression spring presses downward on the opening/closing valve 170 from above the opening/closing valve 170. Accordingly, the opening/closing valve 170 is pressed against the valve seat 168, so that the condensate draining passage 166 is blocked, inhibiting draining of condensate.

Here, of course, the condensate within the storage unit 110 below the opening/closing valve 170 presses the opening/closing valve 170 upward. That is, the condensate within the storage unit 110 flows in through the condensate auxiliary passage 136 and the condensate draining passage 166 to provide upward pressure against the undersurface of the outer plate 174. However, this pressure is not as strong as the biasing force of the valve spring 200 and air pressure against the top surface of the opening/closing valve 170, so that the opening/closing valve 170 remains in a state sealing the condensate draining passage 166.

In this state, when condensate within the storage unit 110 collects and increases in volume, the water level of the condensate gradually rises. As condensate gradually collects over time within the storage unit 110 and the water level of the condensate rises, the ball float 142 having buoyancy continually rises. That is, because the ball float 142 is installed to be capable of pivoting about the hinge pin 154, the ball float 142 tends to rise together with a rise in the water level of condensate.

However, the ball float 142 does not immediately rise together with the water level of condensate collected within the storage unit 110. This is because the needle valve 152 continues to block the air outlet passage 190 due to an air pressure difference. That is, while the air outlet passage 190 is atmospherically pressured by being exposed to the atmosphere, the inside of the air compartment 130 communicates with the inside of the storage unit 110, so that the latter has substantially more pressure. Accordingly, due to this air pressure difference, the needle valve 152 continues to block the auxiliary passage 132.

Also, the left end of the adjusting pin 150 has a certain amount of vertical play. That is, the inner diameter of the space defined in the adjusting bolt 148 can be greater than the outer diameter of the adjusting pin 150, so that even when the left end of the adjusting pin 150 is moved upward by the upward movement of the ball float 142, transfer of force to the needle valve 152 does not occur. The vertical play of the adjusting pin 150 can be, for example, approximately 15°.

Accordingly, the buoyant pressure of the ball float 142 is transferred to the needle valve 152 after the left end of the adjusting pin 150 is pivoted 15° (the vertical play). However, as described above, due to the pressure discrepancy at the left and right of the needle valve 152, even when the water level of condensate in the storage unit 110 rises to a certain level, the ball float 142 is inhibited from rising any further.

However, referring to FIG. 5, when the buoyant force of the ball float 142 exceeds the air pressure within the storage unit 110 pushing the needle valve 152 to the right, the ball float 142 floats to the top of the condensate water level, and thus, the adjusting pin 150 moves to the left, whereupon the needle valve 152 moves to the left and the auxiliary passage 132 that was blocked by the needle valve 152 is opened. Thus, the air outlet passage 190 and the air compartment 130 are communicated.

In this state, the air passage 192, the air compartment 130, and the air outlet passage 190 are mutually communicated, and the air that had applied pressure to the opening/closing valve 170 from above the opening/closing valve 170 flows through the air outlet passage 192 to the air compartment 130, and is then discharged immediately to the atmosphere through the air outlet passage 190.

Accordingly, the pressure on the top surface of the opening/closing valve 170 suddenly decreases, so that pressure above and below the opening/closing valve 170 is immediately negated. That is, the pressure below the opening/closing valve 170 becomes greater than that above, so that the opening/closing valve 170 separates from the valve seat 168 and moves upward, as shown in FIG. 5.

When the opening/closing valve 170 thus moves upward, the condensate draining passage 166 is completely opened to drain condensate within the storage unit 110 to the outside. That is, after the condensate within the storage unit 110 passes through the condensate auxiliary passage 136 and condensate draining passage 166, and rises from the outside to the top of the valve seat 168, the condensate flows downward again through the center of the valve seat 168 and drains to the outside through the outlet end 194.

When the condensate within the storage unit 110 is drained through the condensate draining passage 166, the water level of the condensate within the storage unit 110 is suddenly lowered, and thus, the float ball 142 descends together with the water level of the condensate.

When the ball float 142 descends again to the state depicted in FIG. 4, the adjusting pin 150 moves to the right again, and the needle valve 152 blocks the air outlet passage 190. Thus, system pressure is once again supplied above the opening/closing valve 170, and the condensate draining passage 166 is closed again. That is, air pressure from the compression tank 50 is again applied to the air compartment 130, and the system pressure supplied through the air passage 192 presses the opening/closing valve 170 downward to seal the opening/closing valve 170 against the valve seat 168.

When the condensate draining passage 166 is thus sealed by the opening/closing valve 170, the draining of condensate is stopped, and collecting of condensate occurs again. Through this process, a condensate draining cycle is realized, and the draining of condensate occurs over a short duration by means of the opening of the opening/closing valve 170. Accordingly, air pressure loss within the compression tank 50 and the storage unit 110 is negligible.

Any reference in this specification to "one embodiment," "an embodiment," "exemplary embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with others of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A condensate drain for a compressed air system, comprising:
a storage unit for collecting condensate, the storage unit including a storage main body defining a storage compartment within, a storage panel sealing one side of the storage main body, a plurality of passages guiding a flow of air, and an air compartment within which the plurality of passages are mutually connected wherein the air compartment is a space to which an air inlet passage of the storage unit and an air outlet passage of the storage unit are connected and wherein an adjusting bolt is fastened to the air compartment;
an opening/closing member at a side of the storage unit, wherein the opening/closing member selectively opens and closes a passage through which condensate drains to an outside by vertically moving an opening/closing valve;
wherein the opening/closing member comprises: an opening/closing case mounted at the side of the storage unit to form an exterior of the opening/closing member, and a condensate draining passage defined within the opening/closing case to guide draining of condensate; and
wherein the opening/closing case comprises an upper case and a lower case respectively defining an upper exterior and a lower exterior of the opening/closing case, and the opening/closing valve is inserted and fixed between the upper case and the lower case;
an adjusting member within the storage unit to adjust the opening/closing member,
wherein the opening/closing valve is formed of an elastic material as a single piece diaphragm, comprising: an opening/closing plate that selectively contacts a valve seat to open and close the condensate draining passage through which condensate is drained, an outer plate extending radially outward from an edge of the opening/closing plate, a receiving protrusion protruding upward from the edge of the opening/closing plate, and a fixing end formed on an edge of the outer plate such that the fixing end is inserted in a fixing slot; and
wherein the adjusting member comprises:
a ball float within the storage unit to detect a water level of condensate collected in the storage compartment of the storage unit;
a float arm coupled to the ball float supporting the ball float;
a float fixing bracket fixing the float arm to an inner surface of the storage unit;
the adjusting bolt inserted in and mounted to the air compartment;
an adjusting pin passing through an inner portion of the adjusting bolt; and
a needle valve at one end of the adjusting pin, to selectively open and close an airflow passage of the plurality of passages guiding the flow of air.

2. The condensate drain according to claim 1, wherein the adjusting member further comprises a sealing packing on the adjusting pin for inhibiting condensate within the storage unit from flowing through the adjusting bolt.

3. A condensate drain for a compressed air system, comprising:
a storage unit for collecting condensate, the storage unit including a storage main body defining a storage compartment within, a storage panel sealing one side of the storage main body and an air compartment within which the plurality of passages are mutually connected wherein the air compartment is a space to which an air inlet passage of the storage unit and an air outlet passage of the storage unit are connected and wherein an adjusting bolt is fastened to the air compartment;
an opening/closing member at a side of the storage unit, wherein the opening/closing member selectively opens and closes a passage through which condensate drains to an outside by vertically moving an opening/closing valve, wherein the opening/closing member comprises:
an opening/closing case mounted at the side of the storage unit to form an exterior of the opening/closing member;
a condensate draining passage defined within the opening/closing case to guide draining of condensate; and
the opening/closing valve, wherein the opening/closing valve is provided on the condensate draining passage to selectively open and close the condensate draining passage,
wherein the opening/closing case comprises an upper case and a lower case respectively defining an upper and lower exterior of the opening/closing case, wherein the opening/closing valve is inserted and fixed between the upper case and the lower case; and
an adjusting member within the storage unit to adjust the opening/closing member,
wherein the opening/closing valve is formed of an elastic material as a single piece diaphragm, comprising: an opening/closing plate that selectively contacts a valve seat to open and close the condensate draining passage through which condensate is drained, an outer plate extending radially outward from an edge of the opening/closing plate, a receiving protrusion protruding upward from the edge of the opening/closing plate, and a fixing end formed on an edge of the outer plate such that the fixing end is inserted in a fixing slot.

4. A condensate drain for a compressed air system, comprising:
a storage unit for collecting condensate, the storage unit including a storage main body defining a storage compartment within, a storage panel sealing one side of the storage main body and an air compartment within which the plurality of passages are mutually connected wherein the air compartment is a space to which an air inlet passage of the storage unit and an air outlet passage of the storage unit are connected and wherein an adjusting bolt is fastened to the air compartment;
an opening/closing member at a side of the storage unit, wherein the opening/closing member selectively opens and closes a passage through which condensate drains to an outside by vertically moving an opening/closing valve;
wherein the opening/closing member comprises: an opening/closing case mounted at the side of the storage unit to form an exterior of the opening/closing member, and a condensate draining passage defined within the opening/closing case to guide draining of condensate; and
wherein the opening/closing case comprises case and a lower case respectively defining an upper exterior and a lower exterior of the opening/closing case, and the opening/closing valve is inserted and fixed between the upper case and the lower case;

an adjusting member within the storage unit to adjust the opening/closing member, wherein the opening/closing valve is formed of an elastic material as a single piece diaphragm, comprising: an opening/closing plate that selectively contacts a valve seat to open and close the condensate draining passage through which condensate is drained, an outer plate extending radially outward from an edge of the opening/closing plate, a receiving protrusion protruding upward from the edge of the opening/closing plate, and a fixing end formed on an edge of the outer plate such that the fixing end is inserted in a fixing slot.

* * * * *